(12) United States Patent
Bajocich et al.

(10) Patent No.: US 7,640,074 B2
(45) Date of Patent: Dec. 29, 2009

(54) METHOD AND APPARATUS FOR GENERATION OF DATAMATRIX BARCODES UTILIZING NUMERICAL CONTROL DRILLING PATTERNS

(75) Inventors: Albert M. Bajocich, Seattle, WA (US); David J. Baer, Auburn, WA (US); Kent A. Hall, Tacoma, WA (US)

(73) Assignee: The Boeing Company, Chicago, IL (US)

(*) Notice: Subject to any disclaimer, the term of this patent is extended or adjusted under 35 U.S.C. 154(b) by 209 days.

(21) Appl. No.: 11/939,117

(22) Filed: Nov. 13, 2007

(65) Prior Publication Data
US 2009/0125143 A1    May 14, 2009

(51) Int. Cl.
G06F 19/00 (2006.01)
G06K 19/06 (2006.01)
G06K 21/06 (2006.01)
B23F 1/00 (2006.01)

(52) U.S. Cl. ............... 700/186; 700/159; 700/181; 700/182; 700/183; 235/494; 235/495; 408/3; 409/2; 409/67; 409/289

(58) Field of Classification Search ................ 700/159, 700/181–183, 186; 235/494–495; 408/3; 409/2, 67, 289
See application file for complete search history.

(56) References Cited

U.S. PATENT DOCUMENTS

| | | | |
|---|---|---|---|
| 2,955,489 A * | 10/1960 | Hess | 408/3 |
| 3,242,772 A * | 3/1966 | Grimland | 408/3 |
| 3,246,544 A * | 4/1966 | Cooper | 408/3 |
| 3,828,479 A * | 8/1974 | Highberg et al. | 451/195 |
| 4,446,362 A | 5/1984 | Heyman | |
| 4,486,128 A * | 12/1984 | Baker et al. | 408/3 |
| 5,181,808 A * | 1/1993 | Griggs et al. | 408/1 R |
| 5,529,441 A * | 6/1996 | Kosmowski et al. | 408/1 R |
| 5,612,524 A | 3/1997 | Sant'Anselmo et al. | |
| 6,401,004 B1 * | 6/2002 | Yamazaki et al. | 700/159 |
| 6,533,182 B1 | 3/2003 | Ohshima et al. | |
| 7,017,800 B2 | 3/2006 | Ulrich et al. | |
| 2003/0024679 A1 | 2/2003 | Cantwell | |
| 2003/0110618 A1 * | 6/2003 | Magnuson | 29/720 |
| 2004/0177979 A1 * | 9/2004 | Rubie et al. | 173/28 |
| 2005/0230152 A1 * | 10/2005 | Joslin | 175/67 |

* cited by examiner

*Primary Examiner*—Ramesh B Patel
(74) *Attorney, Agent, or Firm*—Yee & Associates, P.C.; John A. LePore (57) ABSTRACT

The illustrative embodiments provide a method, apparatus, and computer usable program product for generating datamatrix barcodes on parts. A digital datamatrix code associated with a machined part on a numerically controlled machine tool is converted into an x-y drilling pattern contained in a numerically controlled program. A drill cycle associated with a numerically controlled program defines a pattern of dots to be drilled in the machined part to form a dot pattern. A dot pattern is drilled as a series of partially drilled holes on a surface of the machined part to form a datamatrix barcode mark.

22 Claims, 6 Drawing Sheets

METHOD AND APPARATUS FOR GENERATION OF DATAMATRIX BARCODES UTILIZING NUMERICAL CONTROL DRILLING PATTERNS

BACKGROUND INFORMATION

1. Field

The present disclosure relates generally to datamatrix barcodes and in particular to a method and apparatus for generating datamatrix barcodes. More particularly, the disclosure is directed to a method, apparatus, and computer usable program code for utilizing numerically controlled milling machines to generate datamatrix barcodes on parts.

2. Background

A barcode is a machine-readable representation of information. Datamatrix barcodes may be two-dimensional matrix barcodes consisting of dots arranged in a square or rectangular pattern. The pattern of the dots may encode information such as, without limitation, part numbers, manufacturer identifier, part description, unique serial numbers, and/or any other suitable details describing the part. Datamatrix barcodes are typically used to encode data on small parts because datamatrix barcodes can encode more information in a smaller area than more traditional barcodes that use parallel lines to encode data. In fact, line-type barcodes cannot be used on some very small parts due to the space requirements of the line-type barcodes.

Parts may be identified using datamatrix barcodes by printing the datamatrix barcode on paper labels that are attached to the parts. However, these labels can be attached to the wrong part or inadvertently removed or lost.

In another solution, datamatrix barcodes may be created directly on machined parts using dot-peen marking, lasers, and electrolytic chemical etching (ECE). Dotpeening requires specialized equipment and separate setups for parts to be labeled. Dotpeening uses a round tip stylus. The stylus may be impacted into the part to produce a small indentation in the pattern of the datamatrix barcode. The success of a readable mark depends on sensitive setups, especially for unique part surfaces. Dotpeen also causes material to mushroom above the part surface, which causes a Braille-like raised surface on the part. This raised surface can cause interference between close tolerance mating parts and increase surface friction.

Laser marking utilizes a high power energy source to ablate the metal and create a datamatrix pattern on the part. Lasers also may require specialized equipment in controlled areas and shielding for safety. Thus, laser marking may be frequently limited to utilization on small parts which can be housed in an enclosure. Resulting heat damage to sensitive parts may cause stress cracking and is therefore, not approved, for use in many areas and for use on some parts.

Thus, traditional methods of subsurface marking may be characterized by expensive standalone equipment, separate part setups, trial and error results on unique parts, and material displacement on flat surfaces. Users are required to invest in separate equipment, some of which cannot be used on critical parts. In addition, a time delay may be present between the time that a part has completed the manufacture process and the point at which the part is placed on the specialized equipment for marking with a datamatrix barcode. In other words, after parts are manufactured, an interval may be present during which the parts do not have a datamatrix barcode and are thus, unidentifiable.

Accordingly, there is a need for a method and apparatus for minimizing the need for specialized equipment required to generate datamatrix barcodes, minimizing raised surfaces on parts associated with datamatrix barcodes, and minimizing the time during which a part does not have a datamatrix barcode after manufacture of the part, which overcomes the problems discussed above. Embodiments of the disclosure are intended to satisfy this need.

SUMMARY

An embodiment of the present disclosure provides a method, apparatus, and computer usable program product for generation of datamatrix barcodes utilizing N/C drilling patterns on machined parts. An advantageous embodiment provides a method for generating datamatrix barcodes on parts. A digital datamatrix code associated with a machined part on a numerically controlled machine tool is converted into an x-y drilling pattern within a numerically controlled program. A drill cycle associated with a numerically controlled program defines a pattern of dots to be drilled in the machined part to form a dot pattern. A dot pattern is drilled as a series of partially drilled holes on a surface of the machined part to form a datamatrix barcode mark.

Another advantageous embodiment provides a method for generating datamatrix barcodes on machined parts utilizing a numerically controlled machine tool. In this embodiment, a part is machined on the numerically controlled machine tool to final dimensions specified for the part to fabricate a machined part. A digital datamatrix code associated with the machined part is generated on the numerically controlled machine tool into an x-y drilling pattern within a numerically controlled program. A set of drilling parameters is generated. The drilling parameters define parameters for drilling a plurality of dots within a specified area on the machined part. A drill cycle associated with the numerically controlled program identifies a pattern of the plurality of dots to be drilled in the machined part to form a dot pattern. The drill cycle defines the dot pattern based on the drilling parameters. The dot pattern is drilled as a series of partially drilled holes within the specified area on the machined part to form a datamatrix barcode mark. The datamatrix barcode mark is an identifying mark for the machined part under a dot code standard. The datamatrix barcode mark is read by a barcode reader to generate part information for the machined part.

The advantageous embodiments also provide a computer program product for generating datamatrix barcodes on machined parts. The computer program product comprises a computer readable medium with program code stored on the computer readable medium for converting a digital datamatrix code associated with a machined part on a numerically controlled machine tool into an x-y drilling pattern within a numerically controlled program. The computer program product also provides program code stored on the computer readable medium for activating a drill cycle associated with a numerically controlled program to define a pattern of dots to be drilled in the machined part to form a dot pattern. The computer program product also includes program code stored on the computer readable medium for drilling the dot pattern as a series of partially drilled holes on a surface of the machined part to form a datamatrix barcode mark.

In another advantageous embodiment, an apparatus for generating datamatrix barcodes on parts is provided. The apparatus provides a numerically controlled machine tool, a numerically controlled program, and a drill bit tool. The numerically controlled machine tool machines a part to final dimensions specified for the part to fabricate a machined part. The numerically controlled program controls the numerically controlled machine to machine the part to fabricate the machined part. The numerically controlled program further comprises a drill cycle. The drill cycle defines a pattern of dots to be drilled in the machined part to form a dot pattern. The drilling tool drills the dot pattern as a series of partially drilled features on a surface of the machined part to form a datamatrix barcode mark.

In yet another advantageous embodiment, an apparatus is provided for drilling datamatrix barcodes on machined parts utilizing numerically controlled machine tools. The apparatus comprises a datamatrix code conversion component, drilling parameters, a numerically controlled machine tool, a numerically controlled program, and a drill bit tool. The datamatrix code conversion component converts a digital datamatrix code associated with a machined part into an x-y drilling pattern, wherein the datamatrix code conversion module generates a set of drilling parameters. The drilling parameters define parameters for drilling a plurality of dots within a specified area on the machined part. The numerically controlled machine tool machines a part to final dimensions specified for the part to fabricate the machined part. The numerically controlled program controls the numerically controlled machine to machine the part to fabricate the machined part.

The numerically controlled program includes a drill cycle. The drill cycle defines a pattern of dots to be drilled in the machined part to form a dot pattern based on the drilling parameters. The drill bit tool drills the dot pattern as a series of partially drilled holes on a surface of the machined part to form a datamatrix barcode mark.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
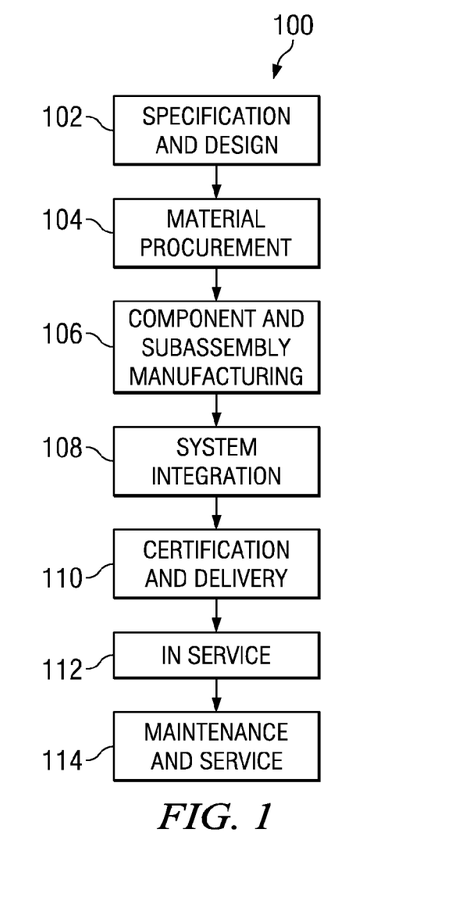
FIG. 1 is an illustration of an aircraft manufacturing and service method in which an advantageous embodiment may be implemented.
Figure 2:
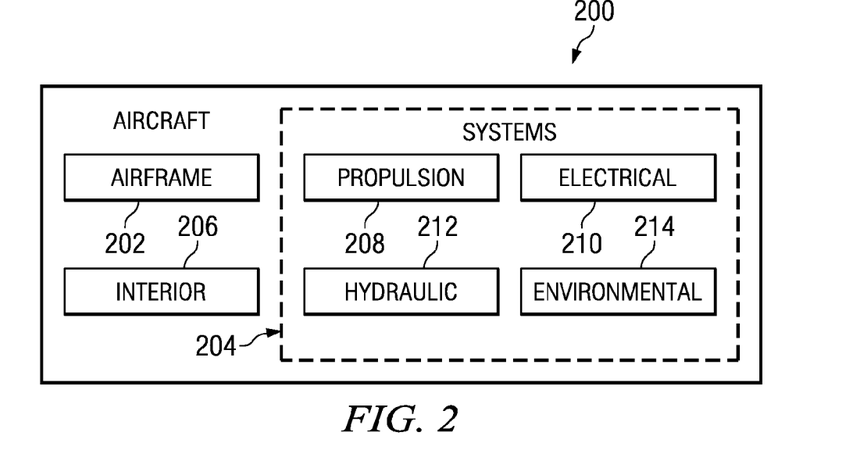
FIG. 2 is an illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. After manufacture, parts of aircraft 200 in FIG. 2 are labeled with datamatrix barcodes. Datamatrix barcodes are used on parts to produce machine readable identification utilizing a small area of the part.

Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. It is desirable to label all components of aircraft 200 with a datamatrix barcode for identification of the components part number, manufacturer identifier, and other information describing the component.

In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The illustrative embodiments provide a method, apparatus, and computer usable program product for generating datamatrix barcodes on parts. A digital datamatrix code associated with a machined part on a numerically controlled machine tool is converted into an x-y drilling pattern within a numerically controlled program. A drill cycle associated with a numerically controlled program defines a pattern of dots to be drilled in the machined part to form a dot pattern. A dot pattern is drilled as a series of partially drilled features on a surface of the machined part to form a datamatrix barcode mark.

Figure 3:
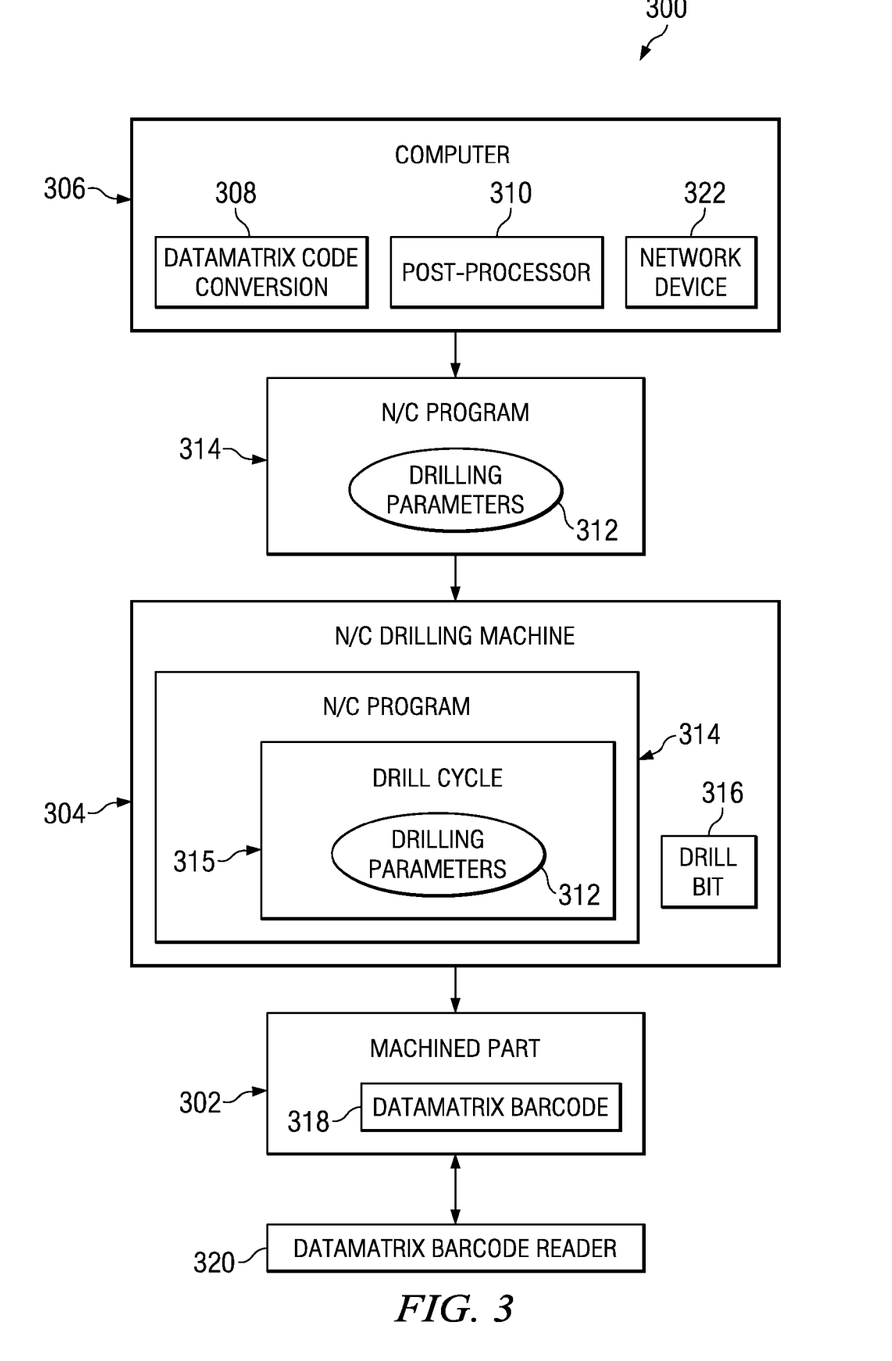
FIG. 3 is an illustration of a system for generating datamatrix barcodes using numerically controlled drilling equipment in accordance with an advantageous embodiment.

FIG. 3 is an illustration of a system for generating datamatrix barcodes using numerically controlled drilling equipment in accordance with an advantageous embodiment. System 300 is a system for generating datamatrix barcodes on machined part 302 using N/C drilling machine 304.

Machined part 302 is any single part, a subpart, or an assembly of two or more parts. A part may also be referred to herein as a component. Machined part 302 may be composed of any material that is capable of being drilled upon, such as, without limitation, stainless steel, aluminum, plastic, or any other suitable material, metal, or plastic. In other words, the process is not material dependent.

In this example, machined part 302 is an aircraft part composed of aluminum. However, machined part 302 is not limited to aircraft parts. Machined part 302 may be a part for any type of machine or device, including, without limitation, a part for a car, truck, boat, aerospace vehicle, construction vehicle, engine parts, windtunnel parts, radio parts, hubcaps, appliances, power tools, or any other type of fabricated part. Thus, the process is not limited to implementation on any particular type of part. The principals of the embodiments may be applied to create a datamatrix barcode marking on any type of part.

N/C drilling machine 304 is implemented on any type of known or available numerically controlled milling equipment having a drilling capability. Milling equipment may also be referred to as N/C milling machine, N/C drilling machine, or N/C milling device. N/C drilling machine 304 produces machined part 302 in accordance with part specifications. When machined part 302 has successfully been produced by N/C drilling machine 304, N/C drilling machine 304 generates datamatrix barcode 318 by drilling a series of dots into the surface of machined part 302 to form a datamatrix barcode pattern in accordance with drilling parameters 312 provided by computer 306.

Computer 306 is implemented in any type of computing device, such as, without limitation, a desktop computer, a laptop computer, a personal digital assistant (PDA), a server, a table PC, or any other type of computing device. Computer 306 receives inputted alphanumeric data for machined part 302. The alphanumeric data is a digital datamatrix two-dimensional code or pixel format data. The alphanumeric data includes part information for machined part 302, such as, without limitation, part number, part description, and/or part manufacturer. This alphanumeric data is in pixel format, which is not usable by N/C drilling machine 304. Therefore, this illustrative embodiment includes datamatrix code conversion 308 to convert the alphanumeric data into an x-y vector geometry capable of being used to generate a datamatrix grid.

Datamatrix code conversion 308 is software for translating alphanumeric datamatrix barcode data into an x-y vector format that is used to drive N/C drilling machine 304 to produce datamatrix barcode 318. In one embodiment, datamatrix code conversion is implemented using computer aided design (CAD) software.

Datamatrix code conversion 308 converts an inputted alphanumeric data to be encoded onto machined part 302 into an x-y vector geometry. The x-y vector geometry is used to identify a drilling pattern to create datamatrix barcode 318. In other words, the x-y vector geometry is converted into x-y vector data for a datamatrix grid pattern and used to define a drilling pattern to create the series of dots for a given datamatrix barcode in a square or rectangular pattern of the datamatrix grid using an x and y coordinate (x,y) system.

Computer 306 may also receive one or more requirements for the datamatrix barcode from a user. The requirements may specify datamatrix formatting and size constraints, such as the size of the datamatrix barcode and the types of information to be included in the datamatrix barcode. For example, datamatrix code conversion 308 scales down a datamatrix barcode from one (1) inch square to a half (½) inch square to accommodate the small size or a part or the amount of surface area of the part available for marking. The datamatrix marks are also scaled up as necessary to accommodate any size requirements or constraints. In contrast, currently available dotpeening processes cannot scale datamatrix barcode marks up or down in size.

Datamatrix code conversion 308 uses the requirements and the x-y drilling pattern to generate requirements and parameters for drilling into a program. Post-processor 310 is a software component that translates or compiles the program specifying the requirements and parameters into a programming language that is understandable or compatible with N/C drilling machine 304 to form N/C program 314.

N/C program 314 is a numerically controlled program that specifies parameters and requirements for generating datamatrix barcode 318. N/C program 314 includes drilling parameters 312. Drilling parameters 312 defines parameters for drilling a plurality of dots within a specified area on the machined part. For example, drilling parameters 312 includes parameters specifying, without limitation, the drill pattern sequence, the size of the datamatrix barcode, the clearance between drilled holes, scaled size of the barcode capable of accommodating the number of dots needed in the amount of area available on machined part 302, speed in revolutions per minute (RPM) and inches per revolution for the drill based on the type of material that machined part 302 is constructed, and/or depth of each hole drilled. Datamatrix code conversion 308 exports drilling parameters 312 into N/C program 314 for utilization by N/C program 314 in controlling drill bit 316 to mark machined part 302 with datamatrix barcode 318.

N/C program 314 is implemented as any known or available program for numerical control of drilling and milling equipment. In other words, N/C program 314 is a common N/C programming package used to control N/C drilling. For example, and without limitation, N/C program 314 may be implemented in software for controlling drilling by an N/C milling machine, such as, without limitation, CATIA, Espirit, Gibbs, Mastercam, or any other type of software for controlling an N/C milling machine to produce a drilling matrix.

N/C program 314 is imported into N/C drilling machine 304 to control drilling performed by N/C drilling machine 304 to produce datamatrix barcode 318 on machined part 302. N/C program 314 generates drill cycle 315 to control drill bit 316 in accordance with drilling parameters 312. Drill cycle 315 is machine readable code within an N/C program 314 that controls the drill pattern sequence and depth of cut made by drill bit 316 to produce datamatrix barcode 318 on machined part 302.

Drill bit 316 is a drilling type cutter used to drill the datamatrix barcode pattern into machined part 302. Drill bit 316 may be implemented as a cutting tool capable of removing material to form a circular machined feature which includes, but is not limited to, engraving tool, twist drill, form tool, starting drill, electrode, and abrasive grinding tool. In this embodiment, drill bit 316 is used to generate datamatrix barcode 318 while machined part 302 is on the same N/C milling machine on which machined part 302 is milled. In other words, machined part 302 may be manufactured or machined to specification on a particular N/C milling machine. Drill bit 316 on the same N/C milling machine may be used to drill machined part 302 with datamatrix barcode 318 without removing machined part 302 from the N/C milling machine. However, in another embodiment, machined part 302 may be placed on the N/C milling machine for drilling after the part is machined on a different milling machine or during a different manufacturing process.

Drill bit 316 creates datamatrix barcode 318 by removing or drilling out material from machined part 302 to create the datamatrix barcode pattern. Thus, the surfaces of machined part 302 do not become raised, as would occur during the dotpeening process. In other words, the drilling process for creating datamatrix barcode 318 does not result in the creation of a Braille-like raised surface. This feature is advantageous because the smooth surface associated with datamatrix barcode 318 does not interfere with mating of parts or create friction or wind-resistance across part surfaces.

The datamatrix barcode may be produced on machined part 302 at any size, such as, without limitation, a datamatrix barcode of 0.25 inches, 1.0 inches, or any other size. In this example, datamatrix barcode 318 is between 0.25 inches and 1.0 inches in size, depending on the number of elements or amount of information encoded within datamatrix barcode.

Datamatrix barcode reader 320 is implemented as an optical scanner, a reader camera, or any other type of known or available device for reading datamatrix barcodes. Datamatrix barcode reader 320 reads datamatrix barcode 318 directly on machined part 302. In another embodiment, datamatrix barcode reader 320 reads information describing machined part 302 from an image of datamatrix barcode 318.

Datamatrix barcode reader 320 decodes the data represented in datamatrix barcode 318. This data is information describing machined part 302, which can be used for, without limitation, maintenance, inventory, parts tracking, identification of replacement parts, and/or identification of substitute parts.

Network device 322 is any type of network access software known or available for allowing computer 306 to access a network. Network device 322 connects to a network connection, such as, without limitation, the internet, Intranet, an Ethernet, a local area network (LAN), or a wide area network (WAN) network. The network connection permits access to the network to permit computer 306 to download drilling parameters 312 to N/C drilling machine 304.

In another embodiment, drilling parameters 312 may be transferred to N/C drilling machine 304 manually by a user physically plugging a data storage device containing drilling parameters 312 into N/C drilling machine 304. The data storage device may be implemented as any type of data storage, such as, without limitation, a hard disk, a floppy disk, a compact disk (CD), a non-volatile random access memory (NVRAM), a compact disk read-only memory (CD ROM), a flash memory, a memory stick, a tape, or any other type of suitable data storage device.

Thus, the embodiment shown in FIG. 3 utilizes existing N/C milling equipment and numerically controlled drilling patterns to create reliable and readable datamatrix labels on machined parts. The process provides the capability to accurately produce two-dimensional datamatrix barcodes on a variety of different milled parts. The process is used to produce datamatrix barcodes on multiple sizes and shapes of parts. In addition, any size N/C milling equipment is used to produce the datamatrix barcodes. This process also allows early identification of parts during fabrication of the parts for subsequent automated part tracking and inventorying.

In this example, drilling parameters 312 are generated on computer 306 that is a separate hardware device than N/C drilling machine 304. In another embodiment, computer 306 is a component within N/C drilling machine 304. In this embodiment, a user enters requirements for datamatrix barcode 318 at an interface on N/C drilling machine 304. In this case, drilling parameters 312 may be generated at N/C drilling machine 304 rather than importing drilling parameters 312 into N/C drilling machine 304.

In another embodiment, if datamatrix barcode 318 is incorrect or if a mistake is made during production of the datamatrix barcode mark, drill cycle 315 can control drill bit 316 to rework the datamatrix mark on the part by making the datamatrix mark at a deeper depth by re-drilling the holes. In contrast, if a mistake is made using currently available dotpeen marking, the user cannot go back and rework the mark or correct mistakes.

In addition, N/C drilling machine 304 can create datamatrix barcode 318 on curved or contoured surfaces because drill cycle 315 controls the depth of the barcode by controlling the depth of the drilled holes. Moreover, N/C drilling machine 304 generates datamatrix barcode 318 on machined part 302 before machined part 302 is removed from N/C drilling machine 304 after milling/manufacture of machined part 302 is complete. Thus, this embodiment enables parts to be marked during manufacture/fabrication of the part, and, thus, avoids any time interval during which the parts are unmarked or unidentifiable by a datamatrix barcode.

Figure 4:
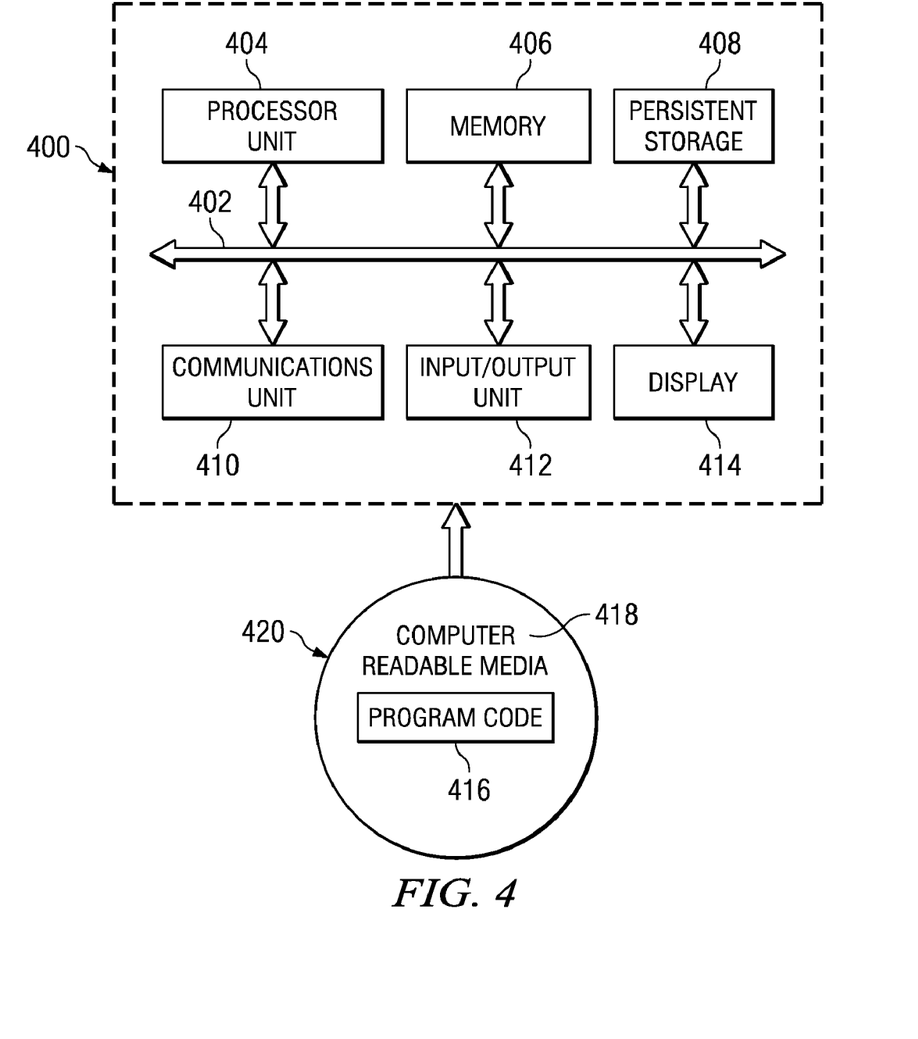
FIG. 4 is an illustration of a data processing system in accordance with an advantageous embodiment.

Turning now to FIG. 4, an illustration of a data processing system is depicted in accordance with an advantageous embodiment. Data processing system 400 is an example of a data processing system that may be used to generate parameters for controlling numerically controlled drilling equipment to generate datamatrix barcodes on parts, such as computer 306 in FIG. 3.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as, program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive or a flash memory that is connected to data processing system 400. The tangible form of computer readable media 418 is also referred to as computer recordable storage media.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

For example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
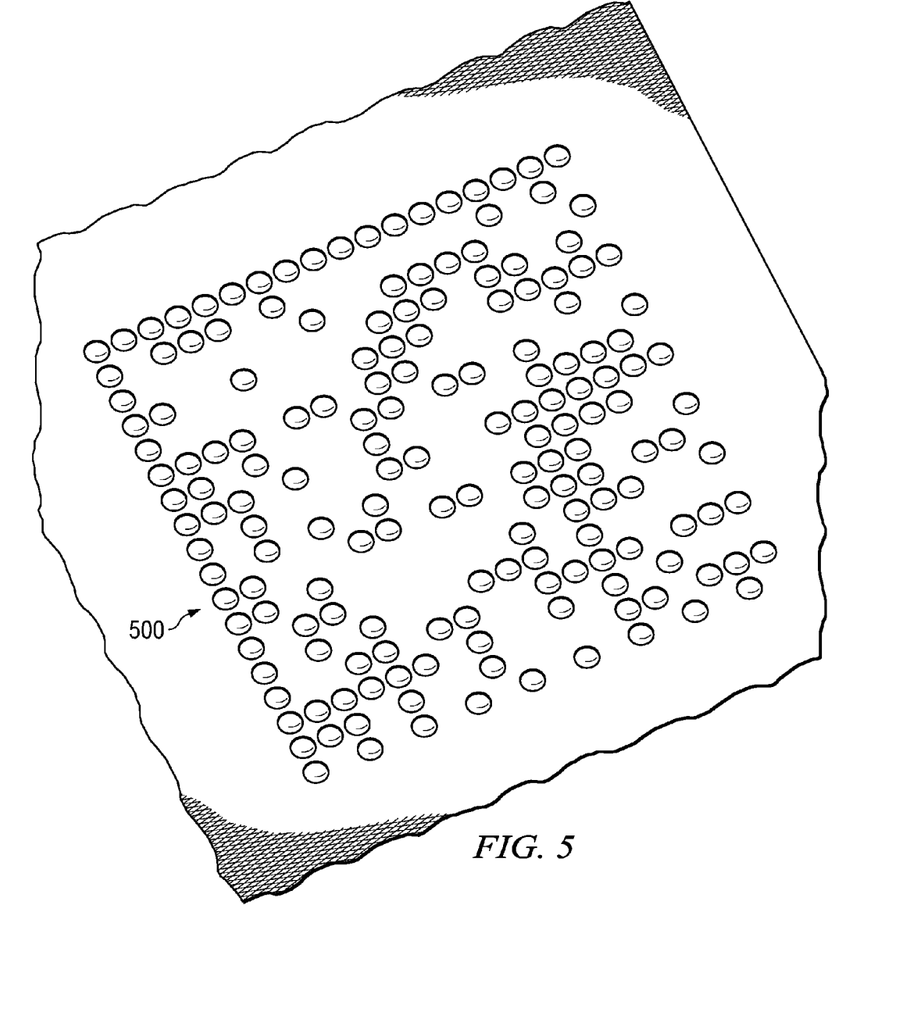
FIG. 5 is an illustration of a datamatrix barcode in accordance with an advantageous embodiment.

Turning now to FIG. 5, an illustration of a datamatrix barcode is depicted in accordance with an advantageous embodiment. Datamatrix barcode 500 is an example of a two-dimensional matrix barcode consisting of a pattern of dots encoding information describing a machined part, such as machined part 302 in FIG. 3. Datamatrix barcode 500 includes a series of dots within a square pattern encoding data. The presence of a dot represents a one (1) and an absence of a dot represents a zero (0), or vice versa. Datamatrix barcode 500 can be read by industry standard barcode readers, such as datamatrix barcode reader 320 in FIG. 3.

FIG. 5 is only an example of one possible datamatrix barcode that is produced using the principals and processes of the illustrative embodiments. Datamatrix barcode 500 is not intended to limit the embodiments to producing only the datamatrix barcode shown in FIG. 5. Datamatrix barcode 500 is generated on a machined part using common or currently available N/C drilling equipment. Datamatrix barcode 500 does not produce a raised, Braille-like surface on the machined part. Moreover, datamatrix barcode 500 does not cause material interferences with mating parts.

The embodiments may be used to produce any type of datamatrix barcode on any machined part that is capable of being drilled by a numerically controlled drilling machine.

Figure 6:
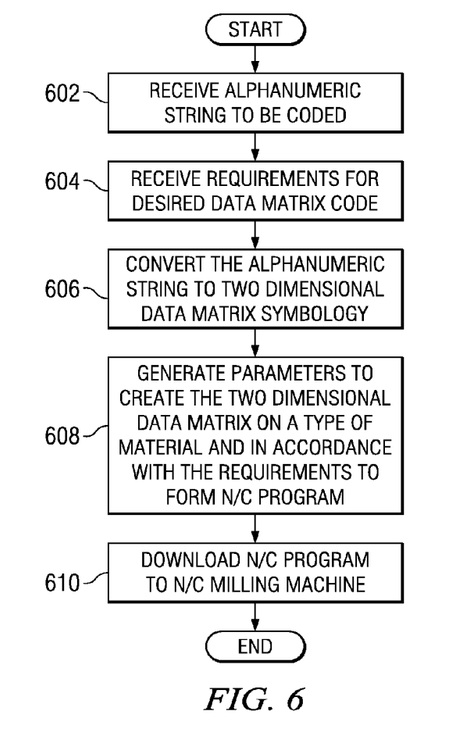
FIG. 6 is a flowchart of a process for generating drilling parameters for utilization by an N/C program to generate a datamatrix code in accordance with an advantageous embodiment.

FIG. 6 is a flowchart of a process for generating drilling parameters for utilization by an N/C program to generate a datamatrix code in accordance with an advantageous embodiment. The process is implemented by software for generating an N/C program to control an N/C milling machine to drill a pattern of dots on the surface of a part to form a datamatrix barcode, such as datamatrix code conversion 308 in FIG. 3.

The process begins by receiving an alphanumeric string to be coded (operation 602). The process receives requirements for the desired datamatrix code (operation 604). The requirements may be received from a user or from another software component. The process converts the alphanumeric string into a two-dimensional datamatrix symbology (operation 606). The process generates parameters to create the two-dimensional datamatrix on a type of material in accordance with the requirements to form an N/C program (operation 608). The process downloads the N/C program to an N/C milling machine (operation 610) with the process terminating thereafter.

Figure 7:
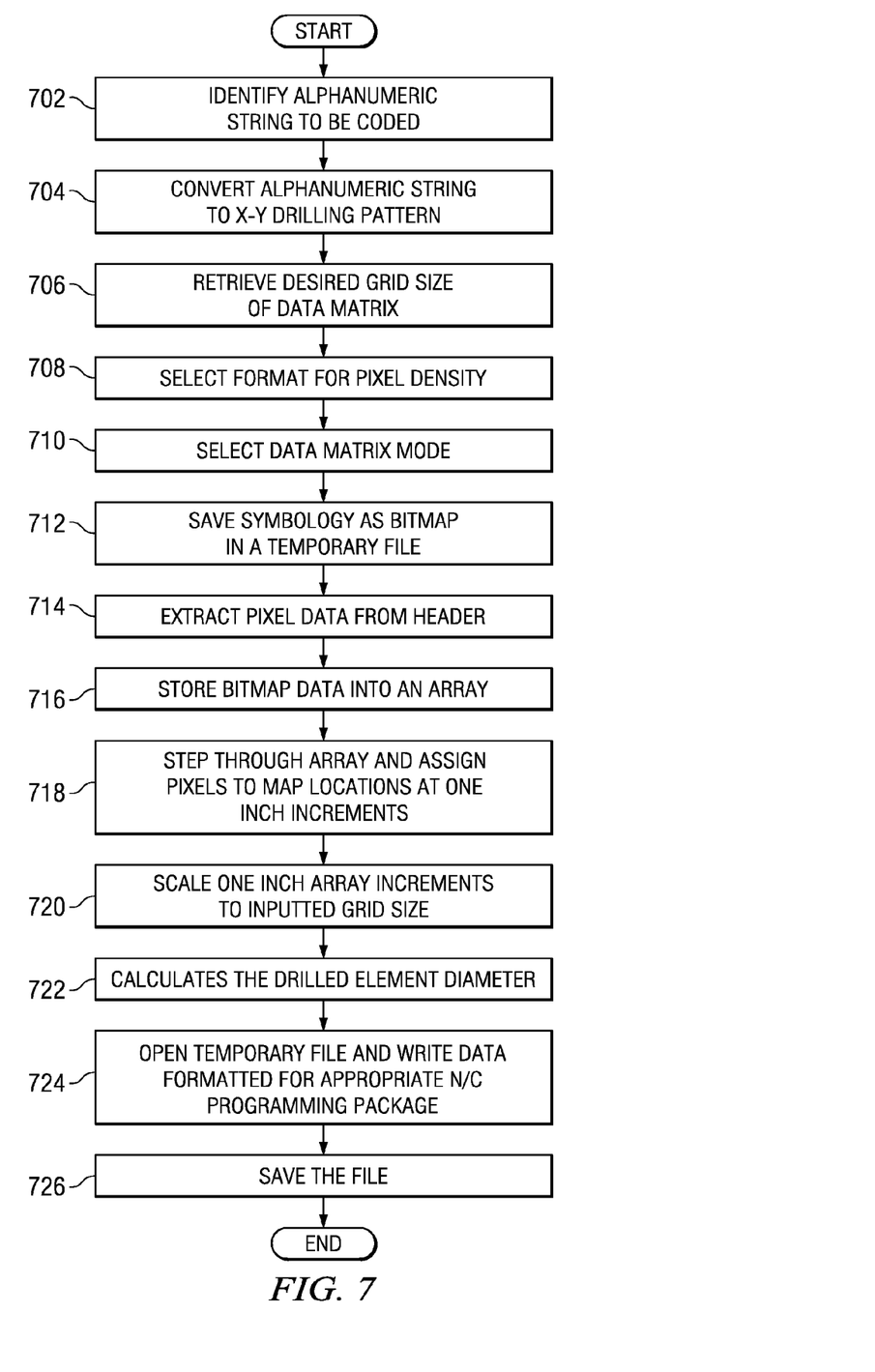
FIG. 7 is a flowchart of a process for converting an alphanumeric string into drilling parameters for a datamatrix barcode in accordance with an advantageous embodiment.

Referring now to FIG. 7, a flowchart of a process for converting an alphanumeric string into drilling parameters for a datamatrix barcode is shown in accordance with an advantageous embodiment. The process is implemented software for generating an N/C program to control an N/C milling machine to drill a pattern of dots on the surface of a part to form a datamatrix barcode, such as datamatrix code conversion 308 in FIG. 3. The process is a more detailed description of operation 608 in FIG. 6.

The process begins by identifying an alphanumeric string to be coded (operation 702). The process converts the alphanumeric string to an x-y drilling pattern (operation 704). The process retrieves a desired grid size of the data matrix (operation 706). The process selects a format for pixel density (operation 708). The process selects a datamatrix mode (operation 710). The process saves symbology of the datamatrix as a bitmap in a temporary file (operation 712).

The process then extracts pixel data from a header in the temporary file (operation 714). The process stores the bitmap data in an array (operation 716). The process steps through the array and assigns pixels to map locations at one inch increments (operation 718). The process scales the one inch array increments to an inputted or identified grid size (operation 720). The process calculates the drilled element diameter (operation 722). The process opens a temporary file and writes data formatted for the appropriate N/C programming package (operation 724). The process saves the file (operation 726) for utilization by the N/C programming package, with the process terminating thereafter.

Figure 8:
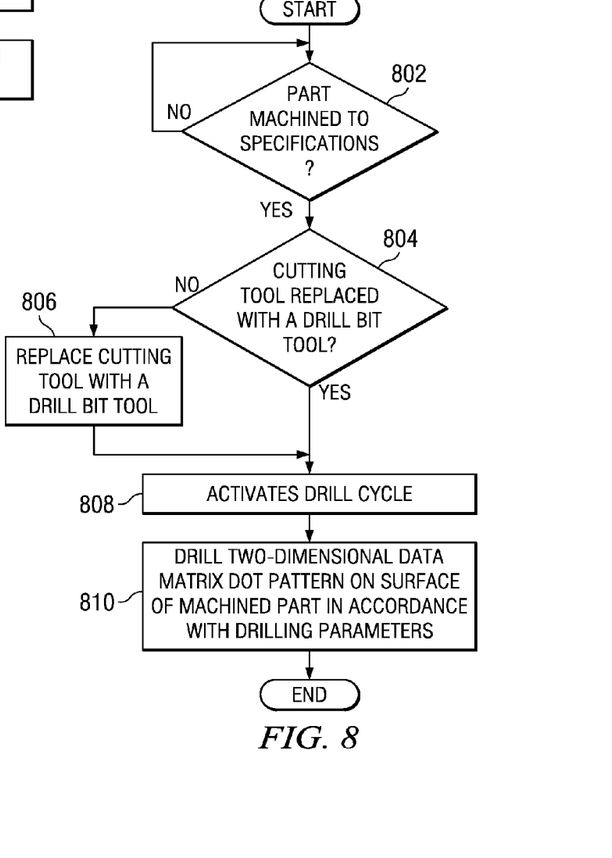
FIG. 8 is a process for generating a two-dimensional datamatrix barcode on a machined part by an N/C milling machine in accordance with an advantageous embodiment.

FIG. 8 is a process for generating a two-dimensional datamatrix barcode on a machined part by an N/C milling machine in accordance with an advantageous embodiment. The process is implemented by an N/C milling machine, such as N/C drilling machine 304 in FIG. 3. Operations 802-806 may be implemented in whole or in part by human users.

The process makes a determination as to whether a part is machined to specification (operation 802). If the part is not machined to specification, the process returns to operation 802. When a part is machined to specifications, the process makes a determination as to whether a cutting tool has been replaced with a drill bit tool (operation 804). If the cutting tool has not been replaced, the process replaces the cutting tool with the drill bit tool (operation 806). The process then activates a drill cycle component of an N/C program to control the drill (operation 808). The process drills a two-dimensional data matrix dot pattern on a surface of the machined part in accordance with drilling parameters (operation 810) under the control of the drill cycle, to form a datamatrix barcode mark on the machined part, with the process terminating thereafter.

The illustrative embodiments provide a method, apparatus, and computer usable program product for generating datamatrix barcodes on parts. A digital datamatrix code associated with a machined part on a numerically controlled machine tool is converted into an x-y drilling pattern within a numerically controlled program. A drill cycle associated with a numerically controlled program defines a pattern of dots to be drilled in the machined part to form a dot pattern. A dot pattern is drilled as a series of partially drilled holes on a surface of the machined part to form a datamatrix barcode mark.

The N/C drilling machine used to generate datamatrix barcodes on machined parts does not require separate setups or specialized equipment to label the machined parts. The process can be scaled to any size or pattern of datamatrix barcode. The N/C drilling machine creates consistent, readable patterns without significant experimentation on part materials or surfaces. This method creates a readable part mark which allows cradle to grave part tracking.

The process in the advantageous embodiments utilizes existing equipment to produce reliable and readable barcodes on machined parts without requiring users to invest in separate equipment. Moreover, the process can be used to directly mark parts with datamatrix barcodes rather than relying on attaching printed labels for automated parts tracking. The process is also advantageous in that the datamatrix barcodes are generated by the N/C milling machine rather than by specialized equipment. Thus, the process is implemented on a single machine rather than requiring additional equipment and secondary set-up of the additional equipment to generate datamatrix marks on parts.

The illustrative embodiments have been described as being implemented to generate datamatrix barcodes that consist of patterns of dots. However, the principles of the embodiments may also be used to generate datamatrix barcodes that consist of square modules within a square or rectangular pattern, concentric circles, or any other type of datamatrix code pattern, without departing from the scope of the embodiments.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computerusable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating datamatrix barcodes on machined parts, the method comprising:
converting a digital datamatrix code associated with a machined part on a numerically controlled machine tool into an x-y drilling pattern within a numerically controlled program;
determining, by a drill cycle associated with the numerically controlled program, a pattern of dots to be drilled in the machined part to form a dot pattern; and
drilling the dot pattern as a series of partially drilled holes on a surface of the machined part to form a datamatrix barcode mark.

2. The method of claim 1 further comprising:
reading the datamatrix barcode mark by a barcode reader to generate part information for the machined part, wherein the part information comprises at least one of a part number, a manufacturer identifier, and a part description.

3. The method of claim 1 further comprising:
machining a part on the numerically controlled machine tool to final dimensions specified for the part to fabricate the machined part.

4. The method of claim 1 further comprising:
using the datamatrix barcode mark as an identifying mark for the machined part, wherein the datamatrix barcode mark is an identifying mark for the machined part under a dot code standard.

5. The method of claim 4 wherein the dot code standard is selected from a group consisting of International Organization for Standardization/International Electrotechnical Commission 16022, International Symbology Specification, and Data Matrix.

6. The method of claim 1 further comprising:
replacing a cutting tool associated with the numerically controlled machine tool with a drill bit tool.

7. The method of claim 1 further comprising:
generating a set of drilling parameters, wherein the drill cycle associated with the numerically controlled program defines the pattern of dots to be drilled in the machined part to form the dot pattern based on the drilling parameters.

8. The method of claim 7 wherein the drilling parameters specify a scaled size of the datamatrix barcode mark capable of accommodating a number of dots needed in an amount of area available on the machined part for drilling.

9. The method of claim 7 wherein the drilling parameters specify a depth of each hole drilled to form the pattern of dots.

10. A computer program product for generating datamatrix barcodes on machined parts, the computer program product comprising:
a computer readable medium;
program code stored on the computer readable medium for converting a digital datamatrix code associated with a machined part on a numerically controlled machine tool into an x-y drilling pattern within a numerically controlled program;
program code stored on the computer readable medium for determining, by a drill cycle associated with the numerically controlled program, a pattern of dots to be drilled in the machined part to form a dot pattern; and
program code stored on the computer readable medium for drilling the dot pattern as a series of partially drilled holes on a surface of the machined part to form a datamatrix barcode mark.

11. The computer program product of claim 10 further comprising:
program code stored on the computer readable medium for reading the datamatrix barcode mark by a barcode reader to generate part information for the machined part, wherein the part information comprises at least one of a part number, a manufacturer identifier, and a part description.

12. The computer program product of claim 10 further comprising:
program code stored on the computer readable medium for using the datamatrix barcode mark as an identifying mark for the machined part, wherein the datamatrix barcode mark is an identifying mark for the machined part under a dot code standard.

13. The computer program product of claim 12 wherein the dot code standard is selected from a group consisting of International Organization for Standardization/International Electrotechnical Commission 16022, International Symbology Specification, and Data Matrix.

14. The computer program product of claim 10 further comprising:
program code stored on the computer readable medium for generating a set of drilling parameters, wherein the drill cycle associated with the numerically controlled program defines the pattern of dots to be drilled in the machined part to form the dot pattern based on the drilling parameters.

15. The computer program product of claim 14 wherein the drilling parameters specify a scaled size of the datamatrix barcode mark capable of accommodating a number of dots needed in an amount of area available on the machined part for drilling.

16. An apparatus for generating datamatrix barcodes on machined parts, the apparatus comprising:
a numerically controlled machine tool, wherein the numerically controlled machine tool machines a part to final dimensions specified for the part to fabricate a machined part;
a numerically controlled program, wherein the numerically controlled program controls the numerically controlled machine to machine the part to fabricate the machined part, and wherein the numerically controlled program further comprises:
a drill cycle, wherein the drill cycle defines a pattern of dots to be drilled in the machined part to form a dot pattern; and
a drill bit tool, wherein the drill bit tool drills the dot pattern as a series of partially drilled holes on a surface of the machined part to form a datamatrix barcode mark.

17. The apparatus of claim 16 further comprising:
a datamatrix code conversion component, wherein the datamatrix code conversion converts a digital datamatrix code associated with the machined part on the numerically controlled machine tool into an x-y drilling pattern within the numerically controlled program.

18. The apparatus of claim 16 further comprising:
a barcode reader, wherein the barcode reader reads the datamatrix barcode mark to generate part information for the machined part, wherein the part information comprises at least one of a part number, a manufacturer identifier, and a part description, wherein the datamatrix barcode mark is an identifying mark for the machined part under a dot code standard.

19. The apparatus of claim 16 further comprising:
a datamatrix code conversion module, wherein the datamatrix code conversion module generates a set of drilling parameters, wherein the drill cycle associated with the numerically controlled program defines the pattern of dots to be drilled in the machined part to form the dot pattern based on the drilling parameters.

20. The apparatus of claim 19 wherein the drilling parameters specify a scaled size of the datamatrix barcode mark capable of accommodating a number of dots needed in an amount of area available on the machined part for drilling.

21. A method for generating datamatrix barcodes on machined parts utilizing a numerically controlled machine tool, the method comprising:
converting a digital datamatrix code associated with a machined part on the numerically controlled machine tool into an x-y drilling pattern within a numerically controlled program, wherein a part is machined on the numerically controlled machine tool to final dimensions specified for the part to fabricate the machined part;
generating a set of drilling parameters, wherein the drilling parameters define parameters for drilling a plurality of dots within a specified area on the machined part;
determining, by a drill cycle associated with the numerically controlled program, a pattern of the plurality of dots to be drilled in the machined part to form a dot pattern, wherein the drill cycle defines the dot pattern based on the drilling parameters; and
drilling the dot pattern as a series of partially drilled holes within the specified area on the machined part to form a datamatrix barcode mark, wherein the datamatrix barcode mark is an identifying mark for the machined part under a dot code standard, wherein the datamatrix barcode mark is read by a barcode reader to generate part information for the machined part.

22. An apparatus for drilling datamatrix barcodes on machined parts utilizing numerically controlled machine tools, the apparatus comprising:
a datamatrix code conversion component, wherein the datamatrix code conversion converts a digital datamatrix code associated with a machined part into an x-y drilling pattern, wherein the datamatrix code conversion module generates a set of drilling parameters,
the drilling parameters, wherein the drilling parameters define parameters for drilling a plurality of dots within a specified area on the machined part;
a numerically controlled machine tool, wherein the numerically controlled machine tool machines a part to final dimensions specified for the part to fabricate the machined part;
a numerically controlled program, wherein the numerically controlled program controls the numerically controlled machine to machine the part to fabricate the machined part, and wherein the numerically controlled program further comprises:
a drill cycle, wherein the drill cycle defines a pattern of dots to be drilled in the machined part to form a dot pattern based on the drilling parameters; and
a drill bit tool, wherein the drill bit tool drills the dot pattern as a series of partially drilled holes on a surface of the machined part to form a datamatrix barcode mark.

* * * * *